US010567389B1

(12) United States Patent
Desai et al.

(10) Patent No.: US 10,567,389 B1
(45) Date of Patent: *Feb. 18, 2020

(54) SYSTEM AND METHOD FOR PROVIDING A WEB SERVICE USING A MOBILE DEVICE CAPTURING DUAL IMAGES

(71) Applicant: Charles Schwab & Co., Inc., San Francisco, CA (US)

(72) Inventors: Jay Desai, San Francisco, CA (US); Konstantinos P. Konstantinides, Martinez, CA (US); Suwat Phruksawan, Pleasant Hill, CA (US); Toby R. Kendall, San Francisco, CA (US); Patrick C. McGraw, Round Rock, TX (US); Dominic E. Caudell, Austin, TX (US); Valery Zubovsky, San Francisco, CA (US); Charles E. Gotlieb, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,978

(22) Filed: Dec. 17, 2018

Related U.S. Application Data

(63) Continuation of application No. 15/729,541, filed on Oct. 10, 2017, now Pat. No. 10,158,646.
(60) Provisional application No. 62/406,332, filed on Oct. 10, 2016.

(51) Int. Cl.
*H04L 29/06* (2006.01)
(52) U.S. Cl.
CPC .......... *H04L 63/102* (2013.01); *H04L 63/083* (2013.01); *H04L 63/0853* (2013.01); *H04L 63/0861* (2013.01)
(58) Field of Classification Search
CPC ..... H04W 12/06; H04W 4/008; H04W 12/08; H04L 63/08; H04L 63/102; H04L 63/10; H04L 63/083; H04L 63/0853; H04L 63/0861
See application file for complete search history.

(56) References Cited

U.S. PATENT DOCUMENTS

| 2013/0179692 | A1* | 7/2013 | Tolba | ...................... H04L 63/08 713/179 |
| 2013/0219479 | A1* | 8/2013 | DeSoto | .................. H04W 12/06 726/6 |
| 2016/0057135 | A1* | 2/2016 | Jiang | .................... H04L 63/0853 713/172 |

* cited by examiner

*Primary Examiner* — Yogesh Paliwal
(74) *Attorney, Agent, or Firm* — Innovation Partners; Charles E. Gotlieb

(57) ABSTRACT

A system and method provides access to one or more web services requested from a web site by using an app on a smart device, such as a smart phone or tablet, or the smart device itself.

18 Claims, 6 Drawing Sheets

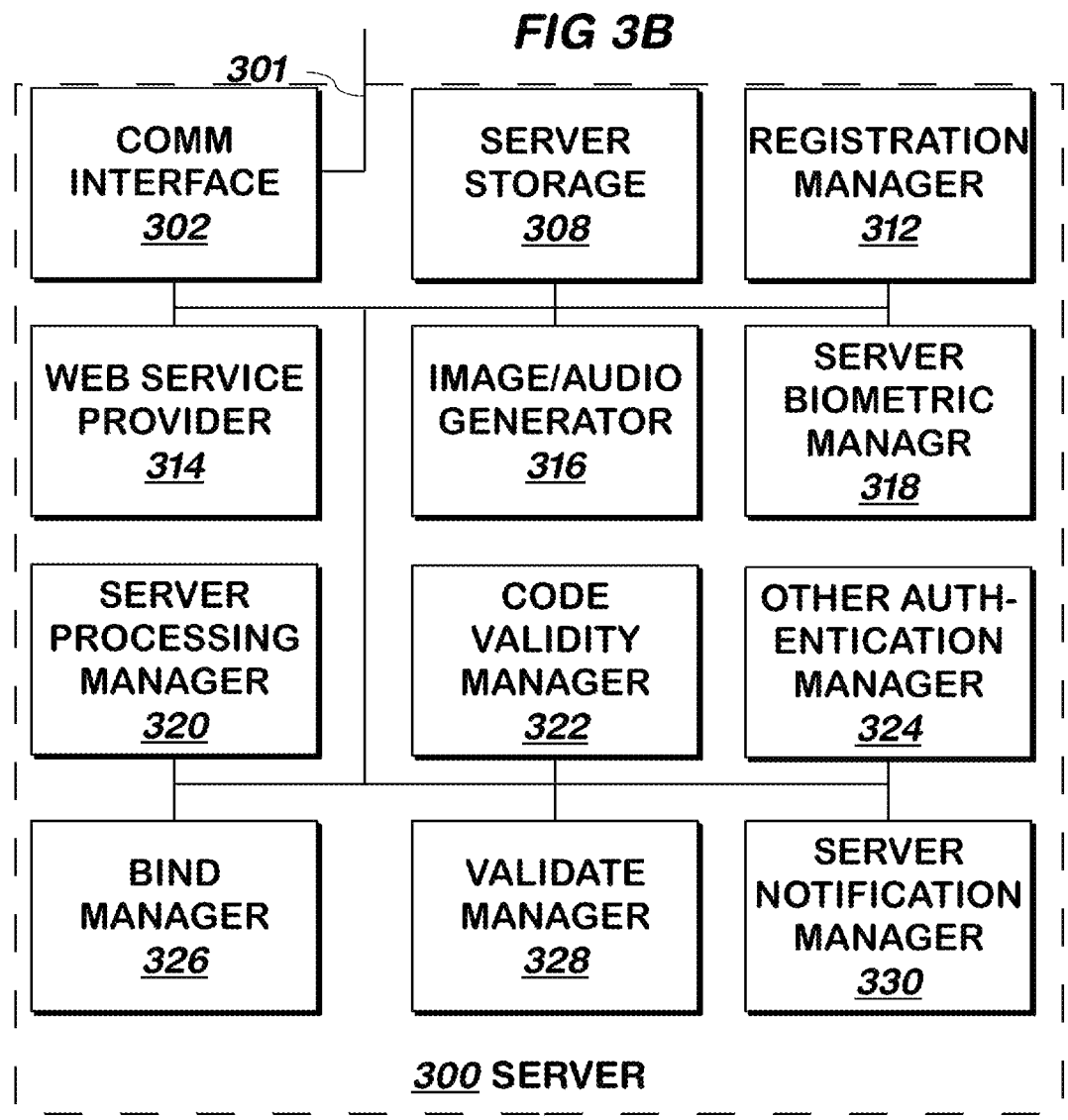

US 10,567,389 B1

SYSTEM AND METHOD FOR PROVIDING A WEB SERVICE USING A MOBILE DEVICE CAPTURING DUAL IMAGES

RELATED APPLICATIONS

This application is a continuation of U.S. patent application Ser. No. 15/729,541 entitled "System and Method for Providing a Web Service Using a Mobile Device Capturing Dual Images" filed on Oct. 10, 2017 by Jay Desai, Konstantinos Konstantinides, Suwat Phruksawan, Toby R. Kendall, Patrick Colin McGraw, Dominic Emile Caudell, Valery Zubovsky and Charles E. Gotlieb, which claims the benefit of U.S. Provisional Patent Application Ser. No. 62/406,332 entitled "Method and Apparatus for Providing a Web Service Using a Mobile Device Capturing Dual Images" filed by Jay Desai, Konstantinos Konstantinides, Suwat Phruksawan, Toby R. Kendall, Patrick Colin McGraw, Dominic Emile Caudell, Valery Zubovsky and Charles E. Gotlieb on Oct. 10, 2016, and is related to U.S. patent application Ser. No. 15/400,935 entitled, "System and Method for Authenticating a User Via a Mobile Device to Provide a Web Service on a Different Computer System" filed by Suwat Phruksawan, Toby R. Kendall, Patrick Colin McGraw, Dominic Emile Caudell, Valery Zubovsky and Charles E. Gotlieb on Jan. 6, 2017, which claims the benefit of U.S. Provisional Patent Application Ser. No. 62/276,204 entitled "Method and Apparatus for Providing a Web Service Using a Mobile Device" filed by Suwat Phruksawan, Toby R. Kendall, Patrick Colin McGraw, Dominic Emile Caudell, Valery Zubovsky and Charles E. Gotlieb on Jan. 7, 2016, each having the same assignee as the present application and each is incorporated by reference in its entirety.

FIELD OF THE INVENTION

The present invention is related to computer software and hardware and more specifically to computer software and hardware for providing one or more web services.

BACKGROUND OF THE INVENTION

Logging into a web site typically is performed by a requesting the web site's home page and then entering a user identifier and password. The user may then obtain web services from the web site. Other web services may be provided after the user authenticates himself or herself via other techniques. Such arrangements are suboptimal.

SUMMARY OF INVENTION

A system and method allows a user to register at a web site to which the user will request one or more web services using a smart device. The user downloads an app to the smart device and authenticates himself to the server via the app. The app has, or is issued, a secure, unique token to allow the app to identify to the server the particular copy of the app used by the user. The server associates the token with the account for which the user authenticated himself upon successful authentication of the user.

In one embodiment, a device identifier is used in conjunction with the token. The device identifier is a unique identifier that is issued to the device, and the token is a long-lived token issued to the app upon successful authentication of the user. In such embodiment, from then on, the token consists of the device identifier sent to the server around the time of the authentication, and the token issued to the device. The device identifier may be checked by the server to ensure that it matches the device identifier for the account stored at the server, when the token for the account is received, to assist in authenticating the long-lived token at the server.

When the user requests a log in page from the server or otherwise requests a web service such as one or more web services requiring authentication, the server provides to the browser for display, user interface elements to allow the user to log in, for example, via a conventional user identifier and password, and displays a first image that allows the user to begin the authentication via the app on their smart device. The first image is a unique image that can be decoded or matched from among a larger set of images to identify a unique code for that image. Audio may encode the code and be used in place of, or in addition to, the images described herein.

The user is optionally instructed to authenticate himself to the app, for example, via biometrics, such as a fingerprint reader managed by the operating system of the device, and if the user successfully authenticates himself or herself, the user is instructed to perform the next step as described below. In the embodiment in which the user does not authenticate himself or herself, the user is instructed to perform the next step as described below.

The user is instructed to use the device to take a photograph of the first unique image displayed by the web site or allow the camera of the device to generate an image of the first image, and the image of the first image is scanned. In the embodiment in which audio is used, the first set of audio is captured and/or scanned, for example, using a microphone of the device or another device that is coupled to the device or the server. The device takes the photograph or otherwise captures the image or audio, and either the app decodes the code from the photograph or captured first image or first audio and uploads the code and token to the server, or the app uploads the photograph or audio file and token for the server to decode the photograph or match it to those issued and not expired. In one embodiment, if the server will decode the image, the app checks the image, for example, by pattern matching parts of it with expected patterns, before uploading it. For example, if the image is encoded into a logo, the logo is pattern matched using conventional techniques so that the image captured is the first image, or the audio captured is the first set of audio. The first image or audio may have a limited "life" or validity period, although such life may be infinite. The life of the first image or audio will be substantially longer than the life of a second image or audio, described below.

In one embodiment, the user will be provided with a feedback visuals, sound or vibration, but in another embodiment, at this point no such feedback is provided.

The server checks the first code, after decoding the image of the first image or the first sound, if it is not received decoded, and, checks the token. If both are valid, the server provides a second image or second set of audio to the user through the web site. The second image or audio is a unique image or audio that can be decoded or matched from among a larger set of images or audio to identify a unique code for that image.

The second image or audio may be unique among both the first and second images, or it may only be unique among the second set of images or audio. The first image or audio may also be unique among both images or audio or only unique among first images or audio. For example, the second image may be the same as a first image that was provided to authenticate a different user. In the case in which images or audio are not unique among both first and second images or audio, the pair of images or audio used will be unique in one embodiment. That is, the combination of first and second images or audio will be unique. The second image or audio will be assigned in the server to the same token as was received with the first token, and will have a very short life, relative to the life of the first image or audio. The user may not be aware that the image or audio has changed, as the difference to a user between the first and second images or audio may be imperceptible or nearly so.

The app captures the second image or audio as described above regarding the first image or audio, automatically, without further input from the user required to capture the first image or audio, and optionally without the user's knowledge (i.e. without providing an indication that any image or audio has been captured). Again the app will decode the image of the second image or audio or perform enough of a check to ensure it is likely to be an image or audio that can be decoded as described above, and uploads the token, with the image of the second image, second set of audio, or second decoded code to the server, along with the token. Audible, visible, or tactile feedback is then provided to the user by the app.

The app may be repeatedly attempting to capture images as it is capturing the first and second images until it is able to decode them or until it can check them as described above, at which point it uploads each of them. The image captured of the second image or its decoded code may not be uploaded or decoded until the app detects a sufficient difference in the images or a different code. The difference may be identified by comparing the image of the first and second image or comparing the first and second audio, or by detecting a separator image or audio that indicates the difference.

The server checks to see that the token is valid, that the second code is not expired and that it is associated with the token. If so, the server may optionally perform further validation of the user (e.g. checking the IP address for one with which the user has successfully used to log in before, or checking the location of the device to ensure it is at or near a location at which the user has successfully logged in before or at or near a location corresponding to an address the user provided as part of the user's registration information), and if the second code is not expired or invalid, the token received with the second code or image of the second image or second audio matches the one associated with it, and the user is optionally further validated, the server associates the user identifier associated with the token to the session corresponding to the code from the image, and invalidates the codes to prevent further use. In one embodiment, invalidating the code may be performed by disassociating it from the session identifier. The first code may be invalidated by the server upon receipt.

Computer code is included as part of the page provided in response to the original request for a log on page or for other web services. The computer code repeatedly queries the server to identify whether the session identifier is associated with a user identifier, or listens for a message that such association has taken place, or performs a combination of both of these. The session identifier is either provided to the server by the code, included with the request and source IP address and port, or is retrieved by the server from the cookie. The frequency of repetition of the query may be reduced over time and may be stopped after a threshold amount of time, at which point the session identifier and code are also invalidated on the server.

Once the server responds affirmatively, the computer code redirects the browser to a different location on the server that validates the token, and if validated, the browser is redirected by the server to a web page to which the user would have been redirected had the user provided a valid user identifier and password to the user interface elements on the home page and pressed a submit button or otherwise authenticated to himself or herself, allowing conventional web services to be provided. Other methods, such as a single sign on protocol, including SAML may be used to allow the web site that provides the image and sign on user interface elements to be different from the web site that will provide the web service. The user is thus authenticated and logged in to the server, without providing any information to the home page user interface elements and without operating any user interface control on such home page, and/or may receive web services provided by the server that require a user authentication and are not provided without such authentication.

In one embodiment, the user enables such functionality of the app, without which, logging in via the app is not performed by the app as described above.

BRIEF DESCRIPTION OF THE DRAWINGS

FIG. 3A is a block schematic diagram of a system for providing one or more web services using an app on a device according to one embodiment of the present invention.

FIG. 3B illustrates a server of FIG. 3A in more detail according to one embodiment of the present invention.

DETAILED DESCRIPTION OF A PREFERRED EMBODIMENT

Figure 1:
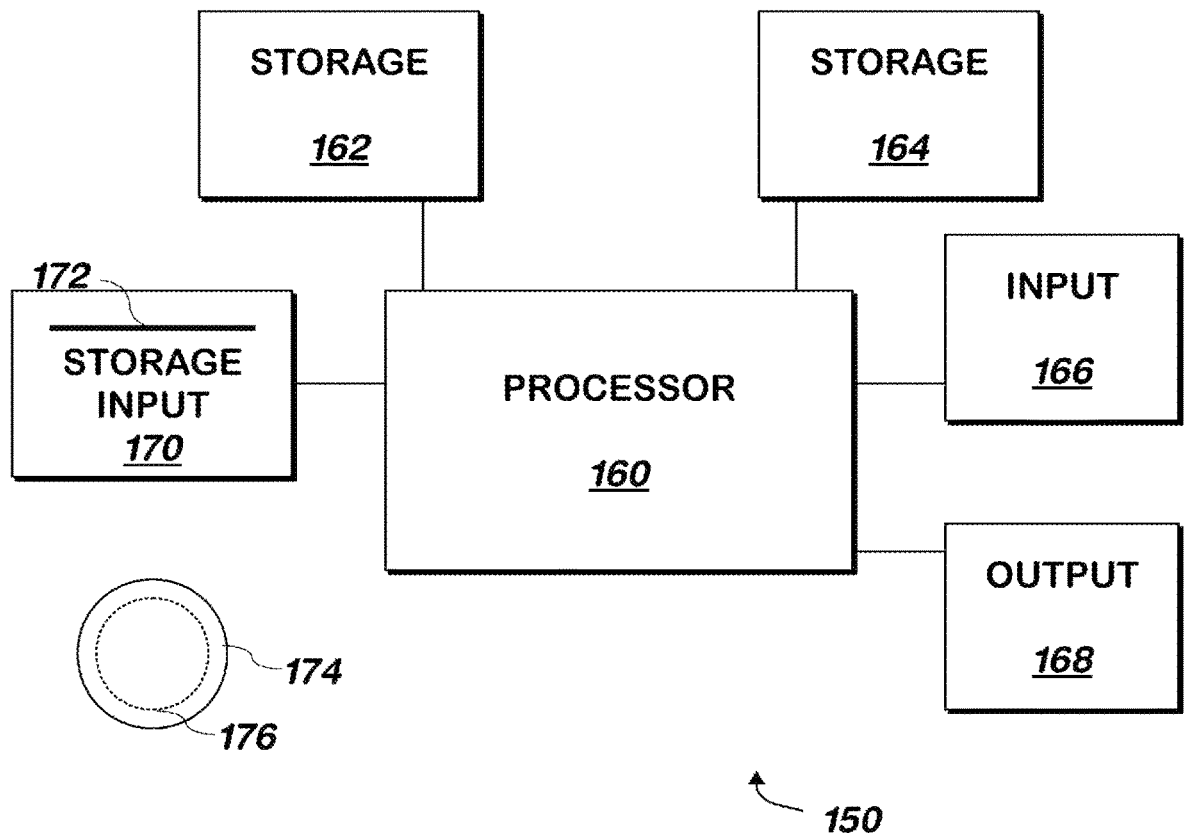
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. Other system elements may include a conventional processor. All elements of a system include any or all of at least one input, at least one output and at least one input/output.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

To operate the method described herein, a specially programmed hardware computer processor may be used, programmed to perform the method described herein. The programming of the method is further explained with reference to the system. Each system element not identified as storage may include a hardware computer processor, specially programmed as described herein. The hardware computer processor may be shared among multiple elements, for example, at different times, or different specially programmed computer processors may be used, up to one per element. Computer program products may be used to specially program the computer processor or processors.

Each system element may include a conventional hardware processor or hardware processor system or processor system or processor that is coupled to a hardware memory or hardware memory system or memory or memory system, each of these being conventional in nature. The processor or processor system may be specially programmed to operate as described herein, and can improve the functioning of the computer system itself to provide web services. All system elements are structural: the only nonce word to be used herein is "means". Each system element described herein may include computer software or firmware running on a conventional computer system. Each system element labeled "storage" may include a conventional computer storage such as memory or disk and may include a conventional database.

Each system element may contain one or more inputs, outputs and/or input/outputs to perform the functions described herein. Any system element may incorporate any of the features of the method and vice versa.

Figure 2A:
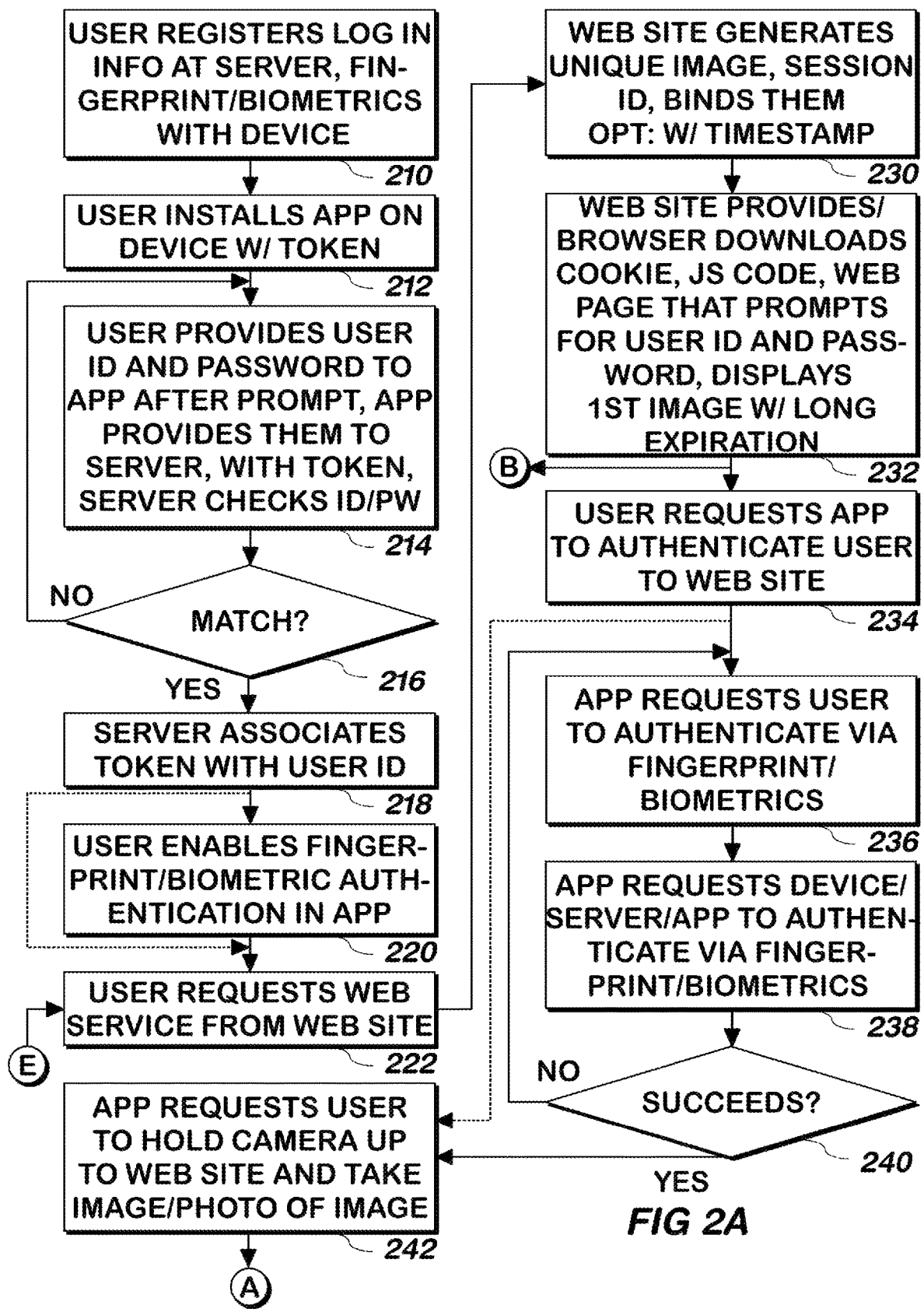
FIG. 2, consisting of FIG. 2A, FIG. 2B and FIG. 2C, is a flowchart illustrating a method of providing one or more web services using an app on a device according to one embodiment of the present invention.
Figure 2B:
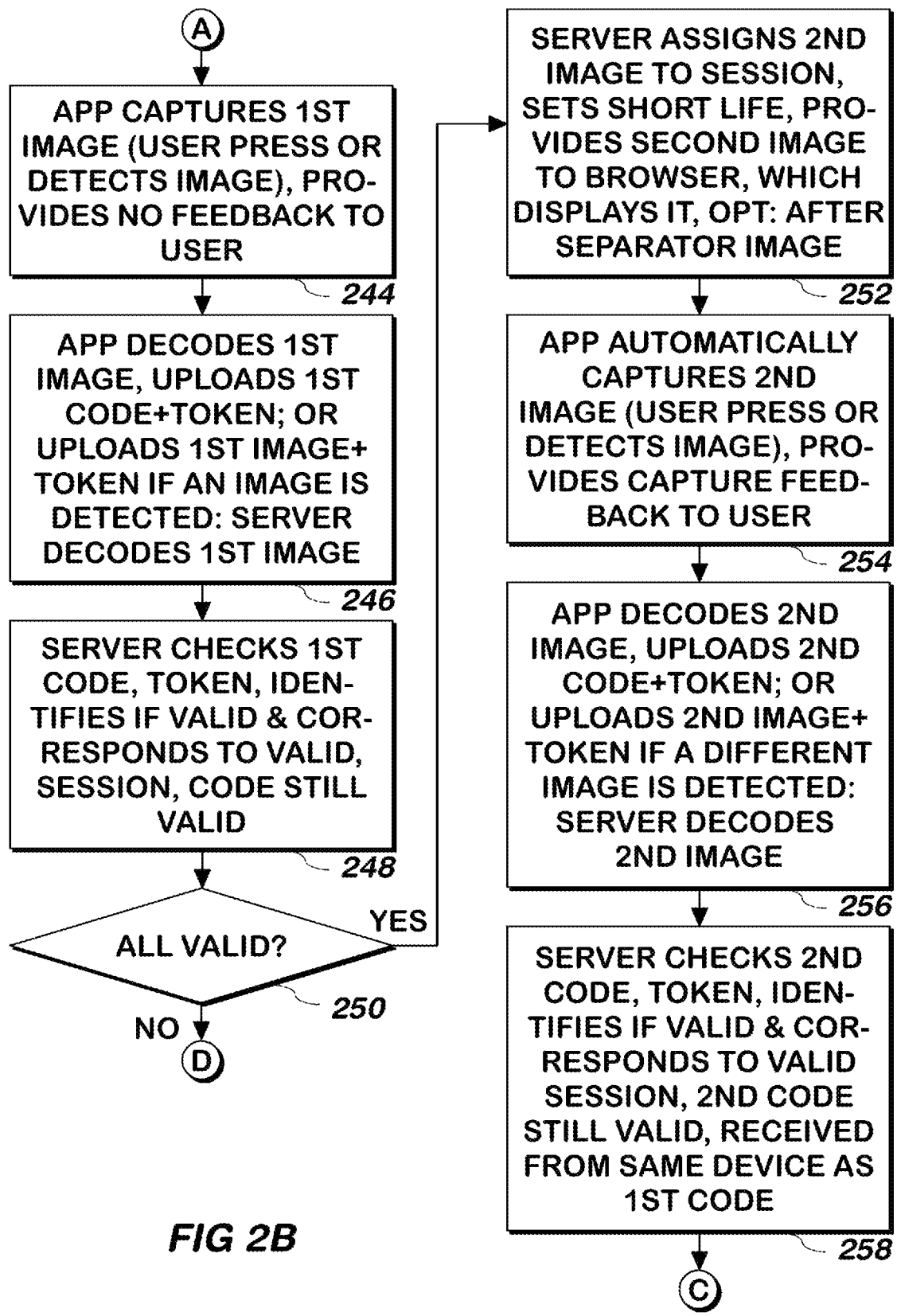
Figure 2C:
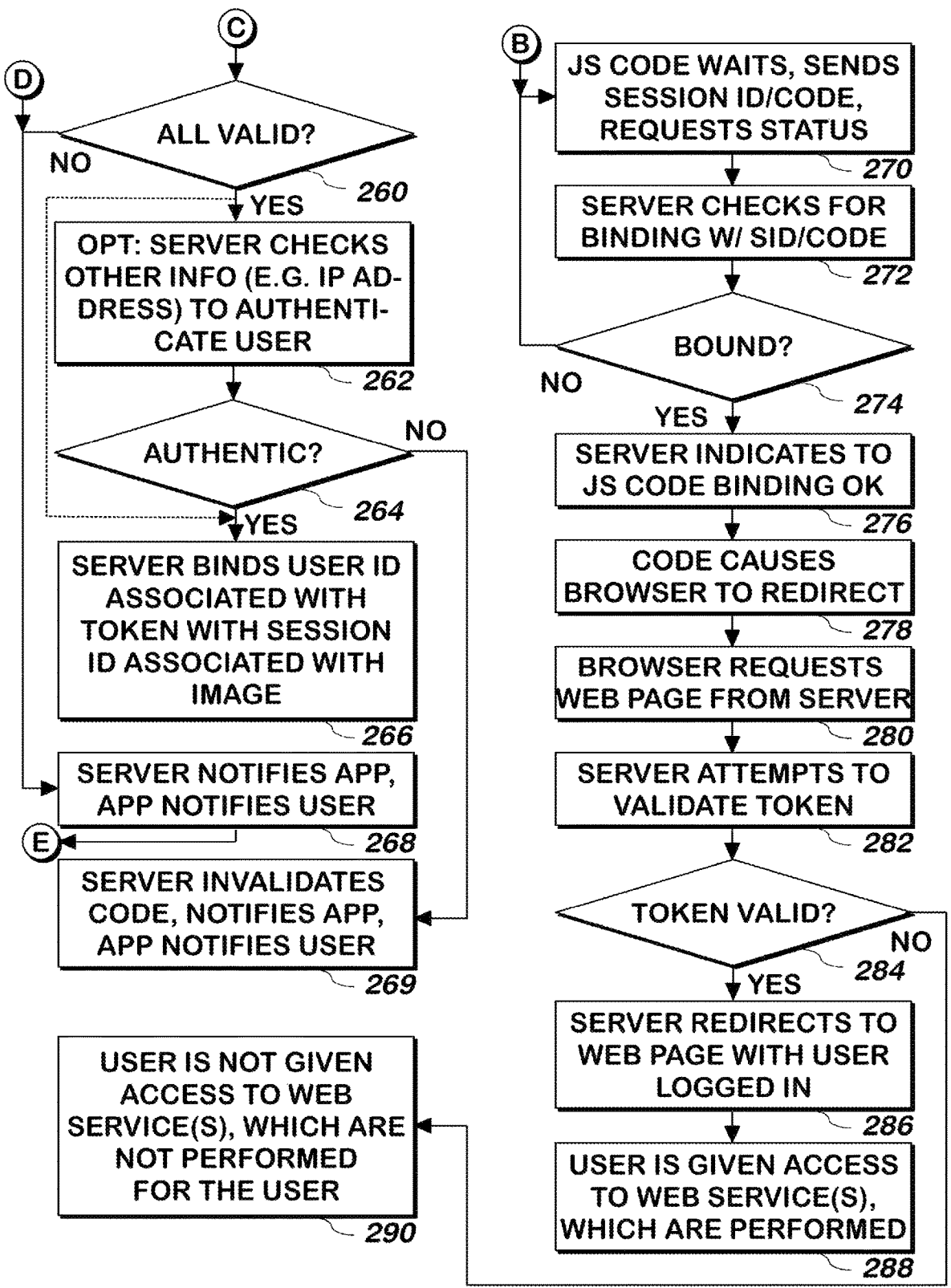

Referring now to FIG. 2, consisting of FIGS. 2A, 2B and 2C, a method of providing one or more web services to a user using an app on a device or the device itself to authenticate the user is shown according to one embodiment of the present invention.

The user registers a user identifier and password and other information described herein with a web site to allow the user to securely log in to that web site with those items 210. Other authentication information may be used instead of a user identifier and password or in addition to them, such as personally identifiable or other information, such as first and last name, driver's license number, date of birth, or biometric information, which includes a voice print, a coded identification of the user's speech characteristics.

Also as part of step 210, in one embodiment, the user registers a fingerprint or other biometric characteristic of that user with the device 210, which may be a conventional smart phone, tablet or other similar device. To do so, the user may use the camera, microphone, and/or fingerprint reader on the device, which records biometric characteristics and assigns them as belonging to the user of the device, either on the device or on the server. In one embodiment, this function is performed by the operating system of the device, although in another embodiment, this function is performed by the app, which is described as being installed after this step, but may be installed before it.

The user installs an application, referred to as an app, on the device 212 using conventional techniques, including an app store or a download to the device. The app has internally stored therein, a token that uniquely identifies the copy of the app installed, remains secure within it, and may only be transmitted encrypted, over a secure connection in one embodiment. The token may be retrieved from a server by the app after it is installed, or the app may be downloaded with the token pre-installed.

The user provides 214 to the app the user identifier and password of that user that allows the user to log in to a website that may be reached via a browser on a computer system that is different from the device, though the user may also use a browser on the device to log in to the web site as well. The different computer system may be a desktop or laptop computer system. The app prompts the user for such log in information as part of step 214. Other methods of identifying the user to the server via the app may be performed, such as by the user supplying information previously received by the server as registration information, such as any or all of their first and last name, date of birth, driver's license or social security number, or a unique code assigned to the user's account upon request, and provided to the user by the server via a website or text message sent to the device, or using other conventional techniques.

Additionally, as part of step 214, the app provides the user identifier and password, and the token, or other authentication information to a server, over a secure communication channel such as HTTPS, optionally after encrypting such information, and the server compares the user identifier and password with the one stored during the registration process of step 210 or issued to the user. Voice may be recorded, and encrypted and uploaded to the server over the secure connection instead of the user identifier and password and the server converts it to a voiceprint when received and compares the voiceprint with one received from the user and stored previously by the server.

If the user identifier and password or voiceprints or other authentication information does not match those stored previously on the server as described above 216, the method continues at step 214. In such case the prompt provided by the app may also inform the user that the authentication information did not match. If the user identifier and password or voiceprints or other authentication information do match 216, the server associates the token received with the account corresponding to the user identifier and password or voiceprint 218.

In one embodiment, the device identifier is provided to the server in step 214 and the token is provided to the app by the server as part of step 218, and each is unique across devices. The server stores the device identifier associated with the token as part of step 218. Each time the token is provided from the app to the server as described herein, the app also provides the device identifier, which the server uses to authenticate the token by comparing the device identifier and the token to those stored to ensure they are both stored associated with the same account.

In one embodiment, the user enables 220 logging into a web site using fingerprint or other biometric authentication or otherwise using the device as described herein, and in another embodiment, no such enabling function is needed, and thus, step 220 is skipped, as indicated by the dashed line in the figure.

At any time after the steps above (either with or without step 220) have been taken, the user may use a computer system such as one that is other than the device on which the app is installed to request to log in to a web site or otherwise request one or more web services, such as one requiring authentication as described herein 222. This may be performed by the user using a browser on a conventional desktop or laptop computer to request a home page of the web site. In response to the request, the web site generates or selects a unique image corresponding to a unique code and a session identifier and stores them on the server associated with one another 230. In one embodiment, the code from the image is used as the session identifier, although such dual use may be less secure, and so in another embodiment, the code is different from the session identifier. The unique image may be any image which can encode a unique identifier, such as an image that contains or is a conventional 'QR code' or an image with a conventional watermark, such as is commercially available from DIGIMARC of Beaverton Oreg. The image may be one that can be compared with other images that have an encoded file name (using the filename of the matched image as the code for the image, without revealing a code in the image itself) or may be decoded itself, for example, measuring the distance in the X and Y planes from the upper right corner of one or more features relative to the size of the image to identify the code, and using the locations of still other features that have known locations to correct for distortions from camera angles and the like. In one embodiment, a timestamp is retrieved from an operating system and stored associated with the code and session identifier on the server. Audio may be used to encode the code instead of an image or in addition to it, for example by embedding tones of a certain frequency at one or more particular points in time relative to a reference tone.

The web site server then provides to the computer system from which the request was received any or all of a cookie with the session identifier or an alternate session identifier associated with the session identifier at the server, optionally encrypted, computer code that operates as described below, and a web page prompting the user for the user's user identifier and/or password and also provides the first image generated or selected, which the browser at the user's computer system receives, displays the user interface elements and the image and operates the code, as described herein and below 232. A first set of audio may be provided to, and rendered by, the browser instead of or in addition to the first image and played by speakers of the computer system, or another device associated with the computer system and in communication with it, as part of step 232. The method continues at step 234 and step 270 of FIG. 2B.

In one embodiment, the session identifier is a unique code generated by the server to identify the session, though it may simply the source IP address and the port from the request for the home page, and is stored on the server but not provided to the user's computer system.

The user then uses the app to request the app to authenticate the user to the web site 234, which may be performed by the user operating a user interface control on the app (e.g. a button) for this purpose.

In one embodiment, instead of the user requesting the app to authenticate the user to the web site, when the user requests the page from an IP address the user has previously used before to authenticate the user, the app is either automatically started by the server, or the user receives a notification that if clicked on, starts the app at the point of authentication of step 236. In one embodiment, step 220 includes enabling this feature and then logging into the web site for the first time after enabling the feature from the IP address the user would like to bind to starting the app. After that time, any request for the home page of the web site made by anyone from that IP address will cause the server to signal the app and place itself into the same state in which it would be after step 234 without the user starting the app or the user directly signaling the app to inform it what the user wants the app to do.

The app requests the user to authenticate himself via the fingerprint reader on the device 236 or by using a different technique such as authentication via iris or face recognition using the camera on the device and the app either requests the device to authenticate the user using biometric information (e.g. fingerprint) and report whether such authentication passed or failed, receives biometric information and uploads a representation of the biometric information to a server and requests the server to report whether the authentication passed or failed using registration information described above, or the app performs the authentication using conventional biometric techniques 238. If biometric authentication fails 240, the method continues at step 236 and otherwise 240, the method continues at step 242.

It is noted that the fingerprint/biometric component of steps 236-240 may be skipped in one embodiment, so that just possession of the device or running the app, which may require authentication, is adequate to enable the web service to be provided, and thus, no authentication, or other forms of authentication, may be used in place of steps 236-240. The 'no authentication' case is indicated by the dashed line in the Figure, bypassing steps 236-240.

Other forms of authentication of the user may be used instead of a fingerprint reader, such as submitting a user identifier and password that can be used to authenticate the user by the app or encrypted and uploaded to the server, whereupon the server decrypts the user identifier and password and compares it to the user's user identifier and password.

At step 242, the app requests the user to point a camera on the device towards the browser displaying the web page of web site on the display of the computer system and take a photo of, or otherwise capture, the first image, using a user interface control of the app (e.g. a button) in one embodiment, or via automatic detection of the image in another embodiment. The method continues at step 244 of FIG. 2B.

At step 244, the app takes a photo of or otherwise captures the first image in response to the user operating the user interface element, or the app detecting the image or audio, and either the app scans and decodes the capture of the first image and uploads the code from the first image and the token to the server, or the app uploads some or all of the capture of the first image and the token, and the server decodes the first image 246. The app may perform such detection, for example, because the user has pointed the camera in the device towards the screen and the app, scanning the images provided by the camera, has detected the image by scanning for patterns associated with the image, such as a logo adjacent to, or part of, the image. If the app will upload some or all of the capture, it does so after checking that the image captured has some indication that it may be the first image. Such information may be encrypted and uploaded via a secure connection. Decoding the image may be performed by reading information in the image or it may be performed by matching the image with one stored on the server that has a code associated with it, such part or all of the filename of that image. As noted, the first set of audio may be captured and decoded instead of the image and the code is then processed as described herein.

Other ways of communicating a code between the website and an app may be employed. The web site may communicate such as via text message to send the code to the app and the app may receive the text message, or the user may read the text message and enter the code to the app. The web site can display the code in numeric form and the user could enter the code to the app. The app would then send the code to the server as described herein. The phone number to which the message was sent would be supplied by the user as part of the registration information to the web site.

The server checks the code from the first image and determines whether the code is not invalid (as described below) and it corresponds to a valid session and checks the token to determine if it is not invalid 248. In one embodiment, a valid session is any session having a session identifier and in another embodiment, a valid session is one that has a session identifier with a timestamp that is issued upon session creation that is not older than a threshold amount of time from the current time, retrieved from an operating system. As noted above the session identifier may be the image or audio identifier or the code decoded from the image or audio or another identifier. In one embodiment, the token is valid if not invalidated, which may occur if the user loses the device or otherwise indicates that the security of the account may have been compromised, for example by changing the password for the account, in which case all tokens associated with the account may be invalidated. The code may be issued with a limited life from when it is provided for display to the user, and is invalid after the limited lifetime expires, as of the time of receipt.

It is noted that no user feedback of the capture of the first image or audio is provided, in one embodiment.

If the code does not correspond to a valid session or is invalid or the token is invalid 250, the server notifies the app and the app notifies the user, for example, to refresh the web page and repeat the process 268 and the method continues at step 222. Refreshing the web page may cause a different first image to be provided as described herein.

If the code does correspond to a valid session 250, the server invalidates the code to prevent further use (the code otherwise being considered valid), the server provides a second image or second set of audio to the user through the web site so that the second image is rendered by the user's browser, for example, in place of the first image 252. The second image is a unique image that can be decoded or matched from among a larger set of images to identify a unique code for that image. As noted, audio may be provided, detected and decoded or otherwise used in place of, or in addition to, any image, for a similar or the same purpose. The second image may be referred to herein as the additional image.

The second image may be unique among both the first and second images, or it may only be unique among the second set of images. The first image may also be unique among both images or only unique among first images. For example, the second image may be the same as a first image that was provided to authenticate a different user. In the case in which images are not unique among both images, the pair of images used will be unique in one embodiment. That is, the combination of first and second images will be unique. The second image is assigned in the server to the same token and/or session as was received with the first token, and will have a very short life, relative to the life of the first image. The user may not be aware that the image or audio has changed, as the difference to a user between the first and second images or audio may be imperceptible or nearly so. However, the server may supply to the browser a separator image or audio to more easily allow the detection of the change by the app on the user device.

The app captures the second image or audio as described above regarding the first image or audio 254. Detection of the separator image may be required to begin detection of the second image or audio, or the change from the first to the second image may be used, at least in part, to detect the second image. The capture may be automatic, without further user input beyond that necessary to capture the first image. Audible, visible, or tactile feedback is then provided to the user by the app as part of step 254 and not before that point. In one embodiment, the feedback is provided to the user as part of step 256, after the app has checked the capture to identify whether it is different than the first image (and optionally, that it followed a separator image) and could be the second image as described herein.

Again the app will decode the image of the second image or audio or perform enough of a check to ensure it is likely to be an image or audio that can be decoded as described above, and uploads the token, with the image of the second image, second set of audio, or second decoded code to the server, along with the token. The app may be repeatedly attempting to capture images as it is capturing the first and second images until it is able to decode them or until it can check them as described above, at which point it uploads them. The image captured of the second image or its decoded code is not uploaded or until the app detects a sufficient difference in the images or a different code. The difference may be identified by comparing the image of the first and second image or comparing the first and second audio, or by detecting a separator image or audio that indicates the difference 256.

The server checks to see that the token is valid, decodes the image if not decoded by the app, and checks that the second code is not expired and that it is associated with the token and/or session 258. If so 260, the method continues at step 262 in one embodiment, and step 266 in another embodiment.

In one embodiment, the server invalidates the codes after they are used as described herein so that they may not be reused. If a code may be encoded into the first image of one user and the second image of another, the codes are invalidated only for use with a first image if encoded into a first image, or invalidated for use as a second image if encoded into the second image, by the server, as part of steps 248 and 258.

At step 262, the server optionally checks other information to indicate the authenticity of the user, such as whether the user has previously logged in from the same IP address as was used to request the web page. In such embodiment, the source IP address of the user computer system is stored associated with the session identifier as part of step 230 and retained for subsequent use. In one embodiment, the app sends last known location coordinates of the user with the token as part of step 262 and such information is used to identify whether the user has previously logged in from a location within a threshold distance of that location as detected previously via a login as described herein, or whether such location is within a threshold distance of an address (e.g. work address or home address) provided by the user during registration of step 210. If the user does not have such an additional indicia of authenticity 264, in one embodiment, the server invalidates the session identifier and/or code for the image and notifies the app, and the app notifies the user that the user must log in via a user identifier and password on the web page in a conventional manner 269. If the user is further authenticated 264, the method continues at step 266. In another embodiment, no such additional authentication is performed and steps 262 and 264 are skipped as shown by the dashed line in the Figure, and step 266 is not used. In one embodiment, the server will only provide the first and second images as part of a page from a given domain or set of domains.

At step 266, the server associates the user identifier associated with the token (and/or device identifier) with the session identifier, which may be the code corresponding to the image, or the source IP address and port for the computer system used to request the home page of the web site, or another identifier, such as the alternate identifier stored in the cookie that is used to locate the session identifier on the server via its association therewith.

Operation of the Computer Code Supplied with the Web Page and Server Response to Such Computer Code.

At step 270, the computer code, such as JAVASCRIPT code, running on the computer system, waits for a period of time, such as one second, then sends the session identifier (which, as described above, may be an assigned unique identifier, the code from the image, or the session identifier may be the source IP address and port that was provided as part of the initial request for the home page of the web site. The session identifier may be retrieved by the server instead of being sent by the computer code) and then requests status from the server. The initial period of time spent waiting may be longer than the period of time between subsequent checks, and such period between subsequent checks may become longer as the time since the computer code was deposited pass thresholds of time, as identified, for example by the code retrieving a system clock when deposited in step 232, and then periodically checking to see if any threshold amount of time has passed before making another request. In one embodiment, when the period of time since the computer code was deposited exceeds the threshold of time used to invalidate the code as described above with respect to step 254, the computer code will terminate and stop checking or performing the functions described herein.

In response to the status request, the server checks 272 whether that session identifier/code has been associated with a user identifier as described in step 266. If such an association has not been made 274, the method continues at step 270, and otherwise 274, the method continues at step 276. In another embodiment, the computer code sends one such request or no requests, and waits for the server to send the indication. The server may check for the association periodically or may send the indication when the association is made.

At step 276, the server indicates to the computer code that the association has occurred, and may deposit a cookie corresponding to a unique session identifier it generates and associates with the user identifier at this stage, if not already performed, and the code redirects to a server page that validates the token 278 and the browser complies 280.

Other methods of allowing the user to be authenticated to one web site from another web site may be used (e.g. SAML), or the user may remain on the same web site, for example, without redirection. To validate the token, a determination is made as to whether it has been associated with an account and/or checked to ensure it has not been revoked. In one embodiment, instead of validating the token or in addition to validating the token, an artifact, a type of token used for the transfer, is validated. The server attempts to validate the artifact and/or token 282, and if the artifact and/or token is valid, the server redirects the user's browser to a web page that operates as if the user has logged in using a user identifier and password or otherwise 286 and the requested web service or services are provided that may only be provided if the user authenticates himself or herself. The validation of the token process may be skipped in one embodiment, so that the user is only redirected one time or no times. The user is then given access to functions provided by the web site only to users who have logged in or otherwise authenticated themselves to a sufficient degree or to the originally requested web service, and any or all such web services are provided 284. For example, the user is allowed to log in and make a trade or the user is allowed to make a trade that exceeds a dollar amount, even if the user was already logged in. In this last case, the authentication technique described herein can provide a higher level of authentication than an ordinary log in. If the token and/or artifact is invalid 284, the user may be redirected to a web page that displays an error message and the user is not logged into the web site and is not given access to such web services or other functions 290.

System.

Referring now to FIG. 3A, a system for providing one or more web services using an app on a device or the device itself is shown according to one embodiment of the present invention. The system operates as described herein. Server 300 includes a conventional web server or other type of server providing a service via the Internet. Device 350 includes a conventional smart device, such as a conventional smart phone or tablet or any other computer system that can run an app as described herein. Computer 340 includes a conventional desktop or laptop computer system or any other computer system capable of running a conventional browser or another program providing similar functionality. A web service includes any service that is provided over the internet such as stock trading or any other service or any other service for which authentication may be preceded.

Figure 3C:
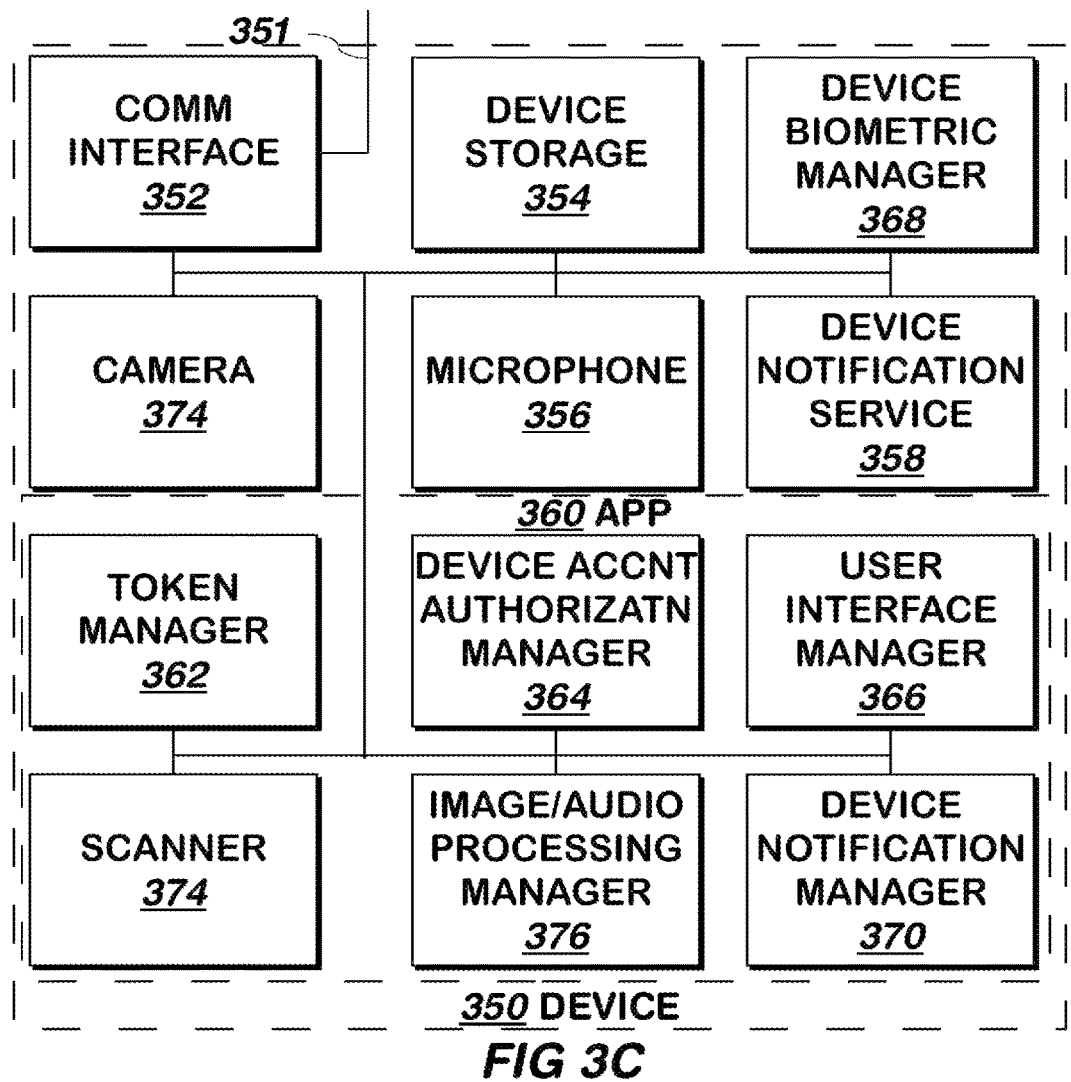
FIG. 3C illustrates a device of FIG. 3A in more detail according to one embodiment of the present invention.
Figure 3D:
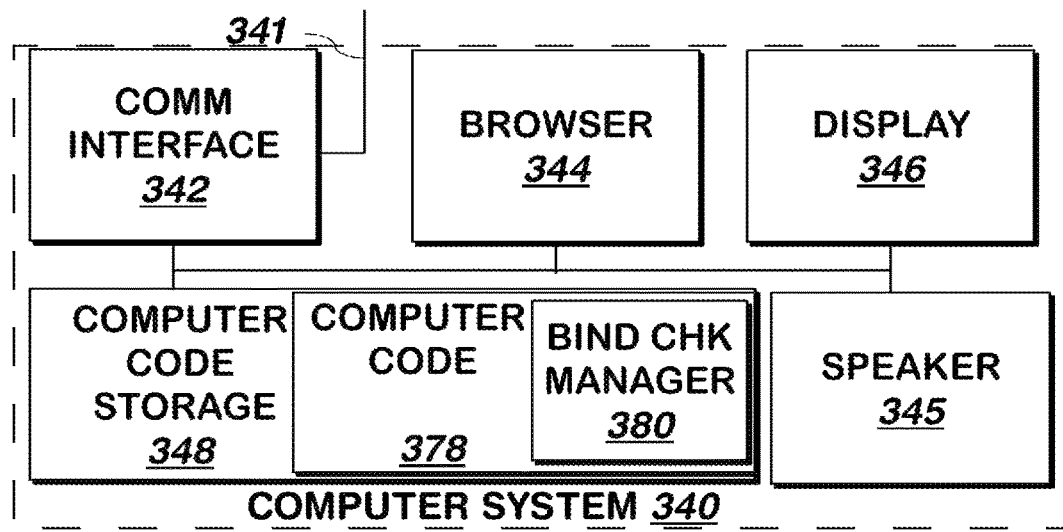
FIG. 3D illustrates a computer of FIG. 3A in more detail according to one embodiment of the present invention.

FIG. 3B illustrates server 300 in more detail according to one embodiment of the present invention. FIG. 3C illustrates device 350 in more detail according to one embodiment of the present invention. FIG. 3D illustrates computer 340 in more detail according to one embodiment of the present invention.

As noted, each element of FIGS. 3A-3D not labeled as storage may contain a conventional hardware computer processor and each element labeled as storage may include conventional computer memory or disk storage. All elements are connected to other elements with which they communicate. The elements of FIGS. 3A-3D are to be interpreted as structural: the only nonce word that may be used herein is "means". Each such element has any or all of an input, output and input/output.

Referring now to FIG. 3A-3D, each such computer system 300, 340, 350 includes a conventional communication interface, such as a conventional TCP/IP communication interface 302, 352, 342 running suitable communications protocols such as TCP/IP, Ethernet or both, and each is coupled via input/output 301, 341, 351 to network 398 such as an Ethernet network, the networks of the Internet, or both and all communication between such computer systems 300, 340, 350 is made via the device's 300, 340, 350 respective input/output 301, 341, 351 of communication interface 302, 342, 352. Some or all communications may be encrypted, for example, using HTPPS, or other conventional techniques. Each such computer system 300, 340, 350 also includes conventional a keyboard, mouse and monitor or display used to communicate with the user of such computer system. Each user may have any number of computers 340 and devices 350 and there may be any number of users.

Registration manager 312 registers users by receiving or providing registration information, such as a user identifier and password, addresses of the user (work and/or home), cell phone number, or other conventional information provided by users when registering, such as the information described herein, and stores such information in server storage 308. As noted, biometric information may be used to register a user and such information may be stored in place of, or in addition to, the user identifier and password.

The user may also register his or her biometric information with the device 350, such as by registering a fingerprint of the user to device biometric manager 368 on the device 350. Device biometric manager 368 may include a conventional fingerprint authentication facility that is supplied with device 350 by its manufacturer, or it may be a part of app 360 and use camera 374 or microphone 356 of device 350. Although an app is described herein, the functionality of the app may be part of device 350 itself.

In one embodiment, device 350 includes a conventional operating system.

The user installs app 360 onto device 350 from a conventional app store or server 300 using conventional techniques. App 360 may include a conventional token as part of the installation or may download one from the server 300 upon installation as described above. The token may be downloaded upon authentication, in another embodiment.

When the user starts the app or device, device account authorization manager 364 provides a user interface to the user of device 350 to request the user to authenticate himself or herself, for example, by providing some of the registration information described above (e.g. user identifier and password, biometric information, driver's license number, etc.) or an identifier supplied by registration manager 312 for this purpose so that the app 360 may authenticate the user to server 300. The user supplies such information, which device account authorization manager 364 supplies to registration manager 312 along with the token. Registration manager 312 receives the information, attempts to locate the registration information it receives and matches it against the information stored in server storage 308, as described above. If such information matches the information for one or more accounts stored in server storage 308, registration manager 312 stores the token in server storage 308 associated with the one or more accounts, and indicates to device account authorization manager 364 that the user has been authenticated. As used herein, a "match" may include a correspondence and need not be an exact match.

The user may at any time enable web services access via the device as described herein by indicating to user interface manager 366 that such access is desired. When it receives such indication, user interface manager 366 stores into device storage 354 a flag that such access is enabled and also provides the flag and the token to registration manager 312, which stores it into server storage 308 associated with the account corresponding to the token. In another embodiment, such access is always enabled at such time as the user authenticates himself or herself the device 350, and no such flag is employed.

User Requests Web Service.

The user uses browser 344 on computer system 340, which includes any conventional computer system, including a desktop or laptop computer system, or a smart device to request a web service. To do so, the user may request a home page from a web site provided by server system 300 to request the web services provided after authentication of the user to the web site. Other web services may be provided, and authentication may be similarly performed, using facilities other than a home page. In one embodiment, if computer system 340 is a smart device, it is not the same device as is used to authenticate the user as described below.

Web service provider 314 receives the request. Web service provider 314 may include a conventional web server. When it receives the request, web service provider 314 signals image/audio generator 316, which generates and stores into server storage 308, or selects, an image or audio from those previously stored in server storage 308 as described above, and provides an identifier of the image or the image or identifier of the audio file or the audio, and the code to web service provider 314, which provides the image or audio or retrieves it from server storage 308 and provides the image or audio to browser 344 for display or playback to the user on display 346 or speakers (not shown) as part of a web page that my also include user interface elements to allow the user to authenticate himself or herself via other techniques as described above. Web service provider 314 also provides computer code 378 that will run under browser 344, which browser 344 receives and stores into computer code storage 348. Browser 344 displays the image on display 346 or plays back the audio and browser 344 runs the computer code 378 in computer code storage 348, which may be conventional RAM or other forms of storage. The operation of computer code is described below. Web service provider 314 stores into server storage 308 the code of the image or audio, the current date and time it retrieves from an operating system (not shown) and an identifier of the session (which may be a unique identifier it generates and stores on the computer 340 in the form of a cookie, or may be the IP address and port from which the request was received), and the date and time, which web service provider 314 retrieves from an operating system (not shown).

In one embodiment, image/audio generator 316 generates a code, but does not need to generate the image or audio, and the code is provided to web services provider 314. Web services provider 314 may display the code itself to the user to allow the user to enter the code, or send it to device 350 such as by texting it to a cell phone number of device 350 stored in server storage 308 by registration manager 312 with the other registration information as described above.

The web page supplied by web service provider 314 may or may not provide instructions to the user to use app 360 on device 350 to take a photograph or scan the image displayed by display 346 or to use the microphone 356 on the device 350 or an external device (not shown) to record or capture the audio.

In one embodiment, the user starts app 360 on device 350 using conventional techniques and indicates to user interface manager 366 that the user wishes to authenticate himself or herself to the web page or otherwise obtain the web service that will be provided when the user so authenticates himself or herself. In one embodiment, user interface manager 366 only allows the user to so indicate if the flag described above is enabled.

In another embodiment, the web service provider 314 checks the IP address from which the request for the web service (e.g. the request for the home page) was received with an IP address stored with the account in server storage 308. The IP address stored in server storage may be the IP address from which the user registered or otherwise authenticated himself or herself at a prior time, that is stored in server storage 308 by server registration manager 312 when the user registers or authenticates himself or herself via the web. The IP address used the last time or IP addresses used the last N times to authenticate the user for a prior instance of a web service, stored as described herein, may be used to identify the user only if there is only one user who last used that IP address in one embodiment. If a match is detected, web service provider 314 provides the account identifier to server notification manager 330 which uses a conventional app notification service to provide a notification to device 350.

In one embodiment, device notification manager 370 has previously registered with such app notification service, received an identifier to use with such service (or used an existing identifier may be used, such as a device identifier that uniquely identifies the device) and provided the identifier to server notification manager 330, along with the token, and server notification manager 330 stores into server storage 308 the identifier associated with the account information to which the token corresponds.

When it receives the account identifier, server notification manager 330 sends device notification service 358 the identifier corresponding to the account identifier and a service code that indicates the user should be treated as if the user had requested the app to authenticate himself or herself to a web page or obtain another web service. A device notification service 358 on device 350 receives the notification from the notification service and displays it to the user in a conventional fashion, such as using an icon in a status bar at the top of the display screen of device 350. The user may use the user interface of the device notification service 358 on device 350 to select the notification, and the device notification service 358 starts app 360 if not already started and provides the service code to device notification manager 370, which reads the service code and, based on the service code, signals user interface manager 366 with an indication that the user wishes to authenticate himself or herself to a web page or to obtain a web service.

In one embodiment, web service provider 314 provides the code to server notification manager 330, which provides the code to device notification manager 370 via the notification service described above, as part of, or all of, the service code, either using or not using the process described above. Device notification manager 370 may display the code to the user for reentry via a user interface element provided and received by device notification manager 370, or may provide the code directly to image/audio processing manager 376, which utilizes it as described below as if it had decoded it, without decoding it from an image.

As noted, in one embodiment, sound can be used instead of an image, with the code embedded in the sound, and decoded from the sound by the device 350 as described herein or by an external device.

When user interface manager 366 receives the indication from the user or the signal and indication from device notification manager 370, in one embodiment, user interface manager 366 prompts the user to authenticate himself or herself to device 350 using the device biometric manager 368. User interface manager 366 enables device biometric manager 368, which authenticates the user using biometrics such as a fingerprint reader built into device 360 or any other conventional biometric reader, such as a microphone 356 for voice authentication or camera for iris or facial recognition, any or all of which may be considered to be part of device biometric manager 368. Device biometric manager 368 authenticates the user, optionally sending a file of biometric information such as a voice file or photograph file to server biometric manager 318 and server biometric manager 318 authenticates the user using conventional biometric authentication techniques and indicates to device biometric manager 368 that the user is authenticated, or device biometric manager 368 authenticates the user using conventional biometric authentication techniques. Device biometric manager 368 indicates to user interface manager 366 whether the user is authenticated.

It is noted that the authentication process may be performed using another technique as described above, by using device biometric manager 368 (which can receive a user identifier and password or other authenticating information as described above) and optionally server biometric manager 318 or skipped entirely by user interface manager 366, in which case device biometric manager 368 need not be used. User interface manager 366 may use other techniques to authenticate the user in other embodiments, or need not authenticate the user at all in still other embodiments.

If the user is indicated to be not authenticated after an authentication attempt, user interface manager 366 so indicates to the user and requests the user to re-authenticate or cancel the operation. If the user is indicated to be authenticated, or is not to be authenticated, user interface manager 366 requests the user to hold camera 374 of device 350 up to display 346 or hold microphone 356 near speaker 345 of computer system 340 and optionally indicate when the user has done so via a user interface element that user interface manager 366 provides. When the user so indicates, or automatically, a short time later, user interface manager 366 signals camera 374 and/or microphone 356 to turn on and/or take one or more images or capture audio and store them into device storage 354, and signals image/audio processing manager 376. Microphone 356 may include a conventional computer audio circuitry or sound card. It isn't necessary to capture an image or audio and store it as described, as the image or audio may be sent to image/audio processing manager 376 and decoded in real time using the output of camera 374 or microphone 356.

When signaled, image/audio processing manager 376 either attempts to decode the code from the image or images from camera 374 or sound from microphone 356 until one or more are decoded or uploads the image or images and the token to server processing manager 320, which attempts to decode the image or one of the images. Decoding may be performed by best matching an image or audio to a stored set of images or audio whose filenames represent the code for the image or by reading information in the image or audio as described above. If server processing manager 320 decodes the image or audio, it so indicates to image/audio processing manager 376 and otherwise image/audio processing manager 376 decodes the image. If the image is decoded by image/audio processing manager 376, image/audio processing manager 376 provides to server processing manager 320 the code and the token.

Server processing manager 320 checks the token to determine if it is valid as described above (i.e. it has not been invalidated) and checks the code to determine whether it is valid as described above (e.g. using the system clock to test whether the code is older than the threshold amount of time allowed and has not been invalidated) and optionally checks the session to determine whether it is valid (e.g. the user has not abandoned it, as indicated by the lack of requests received from bind check manager 380 as described below, which bind manager 326 monitors, and invalidates the session identifier in server storage 308 if an expected request is not received).

In one embodiment, if the user logs into the website using registration manager 312 and changes their password for the account into which they logged in using registration manager 312, registration manager 312 will identify the tokens associated with such account in server storage 308 and invalidate them. A system administrator may invalidate an individual token, for example, if the user reports the device lost or stolen.

In one embodiment, image/audio processing manager 376 may optionally additionally provide to server processing manager 320 other information, such as the location or last known location of device 350, which it retrieves from an operating system (not shown) of device 350, which may be identified using conventional GPS techniques. Additionally, in one embodiment, registration manager 312 maintains in server storage 308 the IP address of the user at the time the user initially registered, and the IP addresses of the last N times the user logged in. Other authentication manager 324 additionally stores the IP addresses of the last M times the user identifier was bound as described below and herein.

In one embodiment, if server processing manager 320 determines any or all of the code, token or session are not all valid, it so indicates (along with identifiers of which were invalid) to image/audio processing manager 376, which informs the user of the error and provides instructions to the user to inform the user what to do to correct the error. The user will not be considered to be authenticated, but may correct the error and retry or may log in via the web page user interface.

In one embodiment, if server processing manager 320 determines any or all of the code, token or session are all valid, it signals image/audio generator 316 with the identifier of the session, and image/audio generator 316 generates and stores into server storage 308, or selects, an additional image or audio from those previously stored in server storage 308 as described above, and provides an identifier of the additional image or the additional image or identifier of the additional audio file or the additional audio, and the code to web service provider 314, which provides the additional image or additional audio or retrieves it from server storage 308 and provides the additional image or additional audio to browser 344 for display or playback to the user on display 346 or speakers (not shown) as part of a web page that my also include user interface elements to allow the user to authenticate himself or herself via other techniques as described above. Web service provider 314 may provide to browser 344 a separator image or audio prior to providing the additional image or audio, the separator image or audio being audio or an image, which may be image or audio that can be detected by image/audio processing manager 376 as a separator image or audio. Web service provider 314 stores into server storage 308 the code of the additional image or audio and an identifier of the session (which may be a unique identifier it generates and stores on the computer 340 in the form of a cookie, or may be the IP address and port from which the request was received) and the current date and time web service provider 314 retrieves from an operating system (not shown).

The user continues to hold camera 374 of device 350 up to display 346 or hold microphone 356 near speaker 345 of computer system 340 and camera 374 and/or microphone 356 continue taking one or more images or audio and/or storing them into device storage 354. It isn't necessary to capture an image or audio and store it as it may be scanned, sent to image/audio processing manager 376 and decoded in real time using the output of camera 374 and/or microphone 356.

Image/audio processing manager 376 continues attempting to optionally decode the separator image and/or audio and continues attempting to decode the code from the additional image or images from camera 374 or additional audio from microphone 356 until one or more are decoded, or uploads the image or images or audio and the token to server processing manager 320, which attempts to decode the image or one of the images or audio or some of the audio. Decoding may be performed as described above. If server processing manager 320 decodes the additional image or audio, it so indicates to image/audio processing manager 376 and otherwise image/audio processing manager 376 decodes the additional image or audio. If the additional image or audio is decoded by image/audio processing manager 376, image/audio processing manager 376 provides to server processing manager the code corresponding to the additional image or audio and the token.

Server processing manager 320 checks the token to determine if it is valid as described above (i.e. it has not been invalidated and is associated with the session) and checks the code to determine whether it is valid as described above (e.g. using the system clock to test whether the code is older than the threshold amount of time allowed and has not been invalidated) and optionally checks the session to determine whether it is valid (e.g. the user has not abandoned it, as indicated by the lack of requests received from bind check manager 380 as described below, which bind manager 326 monitors and invalidates the session identifier in server storage 308 if an expected request is not received). The threshold amount of time, the lifetime, is much smaller for the code for the additional image or audio than it is for the code from the prior image or audio. The lifetime for the code for the additional image or audio may be less than one or two seconds or another time estimated to be an expected amount of time for the code to be provided and received as described herein, and the lifetime for the code for the prior image or audio may be several minutes.

In one embodiment, if server processing manager 320 determines any or all of the code for the additional image or audio, token or session are not all valid, it so indicates (along with identifiers of which were invalid) to image/audio processing manager 376, which informs the user of the error and provides instructions to the user to inform the user what to do to correct the error.

In one embodiment, if server processing manager 320 determines any or all of the code, token or session are all valid, it signals user interface manager 366, which provides feedback to the user, such as by providing a sound or a vibration to the user device 350 via its operating system and provides the user identifier corresponding to the token and the session identifier corresponding to the code to bind manager 326 in one embodiment, or provides any or all of the IP address of the user, the location information of the user and the account identifier corresponding to the token to other authentication manager 324 in another embodiment. In one embodiment, image/audio processing manager 376 so signals user interface manager 366 instead of server processing manager 320 when it decodes the additional image or audio.

Other authentication manager 324 receives such information and checks it against the information stored for the user in server storage 308 as described above, for example, by any or all of: comparing the last known location information against previously registered location information as described above, comparing the IP address against previous IP addresses used to register, log in via username and password, or IP addresses used to log in via coded image as described above. In one embodiment, any or all of these are used to generate a confidence score, with the score being higher if the last known location of the device is near a registered address, higher if the IP address used to request the page containing the image is the same as was used to register the user, higher if the IP address used to request the page containing the image matches more of the set of IP addresses used to recently log in using a user identifier and password or the set of IP addresses used to log in or otherwise request one or more web services using the image, with one set of IP addresses optionally contributing to a greater score than the other set, and lower otherwise. Other authentication manager 324 compares the score against a threshold and if the score is above the threshold, signals bind manager 326 with the user identifier corresponding to the token and the session identifier associated with the image.

If the score is below the threshold, other authentication manager 324 signals server processing manager 320 with the token and indicates that the authentication didn't pass, in which case server processing manager 320 notifies image/audio processing manager 376, which notifies the user to authenticate himself or herself using the user's user identifier and password on the web site or other conventional technique and other identification manager 324 invalidates the code for the image in server storage 308.

When bind manager 326 receives the user identifier and session identifier, it binds them (i.e. associates them) in server storage 308 by associating them with one another, and stores the IP address used to request the image in a list of M most recently used IP addresses for the account corresponding to the user identifier, that it optionally maintains for each account in server storage 308.

Operation of Computer Code.

Bind check manager 380 of computer code 378 waits as described above, and then sends the session identifier to bind manager 326, which checks server storage 308 to see if the session identifier has been bound to (i.e. associated with) a user identifier as described herein. Bind manager 326 indicates to bind check manager 380 whether such binding has occurred and if no such binding has occurred, bind check manager 380 waits as described above and repeats the process. If such binding has occurred, bind check manager 380 requests browser 344 to redirect the user to validate manager 328, which optionally validates the token and, if the token is not validated, provides a web page in response informing the user of the error and requesting the user to authenticate himself or herself using another method. If the token is validated, validate manager 238 redirects browser 344 to provide the web service, such as by establishing that the user has logged in, and allowing the user to perform functions on the web site (e.g. make a securities trade), for example that require the user be logged in or otherwise authenticated. In one embodiment, the web service is a securities trade above a threshold dollar amount, so that even if the user is already logged into the account, the authentication process using the device is performed as described herein before the trade is allowed to be initiated.

Conventional single sign on techniques such as SAML may be used to allow the user to authenticate to the ultimate web site from the first web site.

As noted above, it isn't necessary for bind check manager 380 to repeatedly query bind manager 326, as it may query only one time, or not at all, bind manager 326 may send the indication to bind check manager 380 that the binding has occurred when it performs such binding.

It is also noted that one or both redirections may be omitted, and that the token need not be validated by validate manager 382 or an artifact may be validated in addition to or instead of the token.

In one embodiment, periodically, code validity manager 322 checks the codes issued for a session, but not invalidated, to determine whether they are expired based on the timestamp for when the code was used and the current time it retrieves from an operating system. Code validity manager 322 invalidates such codes, for example, by marking the code invalid in server storage 308.

It is noted that each user may have their own device and there may be any number of users who log in or otherwise request any number of web services as described above any number of times.

In one embodiment, a charge is assessed for each code provided or each code that is used to authenticate a user, and such charges are paid. Quantity discounts may be applied based on the number of codes provided or used to authenticate the user, and may be applied based on the ratio of the number of codes used to codes provided.

CERTAIN EMBODIMENTS

Described is a method of authenticating or otherwise granting access to a user for a web service, the method including: receiving at a first computing device a request from a second computing device to authenticate the user for the web service; in response to the request, returning a first code from the first computing device to the second computing device, in a form that, when rendered by the second computing device is rendered by the second computing device in a human perceptible way, with the first code encoded in such rendering; by a third computing device, different from the first computing device and the second computing device, capturing a first human perceptible rendering performed by the second computing device of the encoded first code and providing an identifier of the user after the third computing device has authenticated the user; identifying the first code from the first human perceptible rendering captured; in response to the identifying the first code, providing a second code from the first computing device to the second computing device, in a form that, when rendered by the second computing device is rendered by the second computing device in a human perceptible way, with the second code encoded in such rendering; by a third computing device, different from the first computing device and the second computing device, capturing a second human perceptible rendering performed by the second computing device of the encoded second code and providing an identifier of the user, automatically, without requiring user input beyond any user input used to cause the capturing the a human perceptible rendering performed by the second computing device of the encoded first code; identifying the second code from the second human-perceptible rendering captured; and granting access to the web service to be provided using the first computing device, responsive to the second code identified, the identifier of the user and an amount of time between a first time substantially at which the second code was provided and a second time substantially at which the second code is identified.

The method may include optional features whereby at least one selected from a group including the first human perceptible rendering captured and the second human perceptible rendering captured is at least a part of an image.

The method may include optional features whereby at least one selected from a group including the first human perceptible rendering captured and the second human perceptible rendering captured is at least a part of audio.

The method may include optional features whereby the web service is granted additionally responsive to at least one action performed by the second computing device.

The method may include optional features whereby the access is granted additionally in response to two or more queries made by computer code executing on the second computing device that is deposited onto the second computing device by the first computing device in response to the request.

The method may include optional features whereby the second computing device authenticates the user via a biometric authentication.

Described is a system for authenticating or otherwise granting access to a user for a web service including: a web service provider at a first computing device, the web service provider having an input coupled to a second computing device over a network, the web service provider input for receiving a request from a second computing device to authenticate the user for the web service, the web service provider for providing at an output a first signal responsive to the request; and an image/audio generator having an input coupled to the web service provider output for receiving the first signal, the image/audio generator for providing at an output, in response to the first signal, a first set of information containing an encoded first code that can be rendered by the second computing device in a human perceptible way with the first code encoded in such rendering, and the first code; and wherein the web service provider input is additionally coupled to the image/audio generator output for receiving the first set of information, the web service provider output is additionally coupled to the second computing device, and the web service provider is additionally for providing at the web service provider output, the first set of information to the second computing device in response to the request; a device account authorization manager at a third computing device, separate from the first computing device and the second computing device, and having an input for receiving authentication information, the device account authorization manager for authenticating the user responsive to the authentication information, and for providing at an output a token identifying the user in response to the authenticating; one selected from the group including A and B:

A. an image/audio processing manager, at the third computing device, having an input coupled to the device account authorization manager output for receiving the token and to a camera or microphone of the third computing device, the image/audio processor for capturing via the camera or microphone a first human perceptible rendering of the first set of information performed by the second computing device where the rendering has the first code encoded therein, the image/audio processing manager for identifying a second code from the first human-perceptible rendering captured and providing the second code and the token at an output; and a server processing manager having an input coupled to the image/audio processing manager output for receiving the second code and token; and B. a image/audio processing manager, at the third computing device, having an input coupled to the device account authorization manager output for receiving the token and to a camera or microphone of the third computing device, the image/audio processor for capturing via the camera or microphone a first human perceptible rendering of the first set of information performed by the second computing device where the rendering has the first code encoded therein, the image/audio processing manager for providing at an output at least some of the first human-perceptible rendering captured and the token; and a server processing manager having an input coupled to the image/audio processing manager output for receiving the at least some of the first human-perceptible rendering captured and the token, the server processing manager for identifying a second code from the at least some of the human-perceptible rendering received;

and wherein: the server processing manager input is additionally coupled to the image audio generator output for receiving the first code, and the server processing manager is additionally for comparing the first code with the second code and for providing at an output a second signal responsive to the token and to the first code corresponding to the second code; the image/audio generator input is additionally coupled to the server processing manager output for receiving the second signal, the image/audio generator additionally for providing at an output, in response to the second signal, a second set of information containing an encoded third code that can be rendered by the second computing device in a human perceptible way with the third code encoded in such rendering, a current date and time, and the first code; and the web service provider input is additionally coupled to the image/audio generator output for receiving the second set of information, and the web service provider is additionally for providing at the web service provider output, the second set of information to the second computing device; one selected from the group including C and D:

C. the image/audio processor is additionally for capturing via the camera or microphone a second human perceptible rendering of the second set of information performed by the second computing device where the rendering has the third code encoded therein, the image/audio processing manager for identifying a fourth code from the second human-perceptible rendering captured and providing the third code and the token at an output; and the server processing manager input additionally for receiving the third code and token; and D. the image/audio processor additionally for capturing via the camera or microphone a second human perceptible rendering of the second set of information performed by the second computing device where the rendering has the third code encoded therein, the image/audio processing manager for providing at an output at least some of the second human-perceptible rendering captured and the token; and the server processing manager is additionally for receiving the at least some of the second human-perceptible rendering captured and the token, the server processing manager for identifying a fourth code from the at least some of the human-perceptible rendering received; and the server processing manager input is additionally for receiving the third code and the current date and time, and the server processing manager is additionally for comparing the third code and the fourth code, and for providing at the server processing manager output a third signal responsive to the token, to the current data and time received at the server processing manager input and to the third code corresponding to the fourth code; and the web service provider input is additionally for receiving the third signal, and for providing the web service responsive to the third signal.

The system may include optional features whereby least one selected from a group including the first human perceptible rendering captured and the second human perceptible rendering captured is at least a part of an image.

The system may include optional features whereby at least one selected from a group including the first human perceptible rendering captured and the second human perceptible rendering captured is at least a part of audio.

The system may optionally additionally include a bind check manager on the second computing device for, performing at least one action via an input/output; and wherein the access is granted additionally responsive to the at least one action.

The system may include optional features whereby: the bind check manager comprises computer code deposited on the second computing device by the web service provider via the web service provider output in response to the request; and the at least one action comprises two or more queries made by the bind check manager operating on the second computing device.

The system may include optional features whereby the authentication information comprises biometric information.

Described is a computer program product including a computer useable medium having computer readable program code embodied therein for authenticating or otherwise granting access to a user for a web service the computer program product including computer readable program code devices configured to cause a computer system to: receive at a first computing device a request from a second computing device to authenticate the user for the web service; in response to the request, return a first code from the first computing device to the second computing device, in a form that, when rendered by the second computing device is rendered by the second computing device in a human perceptible way, with the first code encoded in such rendering; by a third computing device, different from the first computing device and the second computing device, capture a first human perceptible rendering performed by the second computing device of the encoded first code and provide an identifier of the user after the third computing device has authenticated the user; identify the first code from the first human perceptible rendering captured; in response to the identifying the first code, provide a second code from the first computing device to the second computing device, in a form that, when rendered by the second computing device is rendered by the second computing device in a human perceptible way, with the second code encoded in such rendering; by a third computing device, different from the first computing device and the second computing device, capture a second human perceptible rendering performed by the second computing device of the encoded second code and provide an identifier of the user, automatically, without requiring user input beyond any user input used to cause the capturing the a human perceptible rendering performed by the second computing device of the encoded first code; identify the second code from the second human-perceptible rendering captured; and grant access to the web service to be provided using the first computing device, responsive to the second code identified, the identifier of the user and an amount of time between a first time substantially at which the second code was provided and a second time substantially at which the second code is identified.

The computer program product may include optional features whereby at least one selected from a group including the first human perceptible rendering captured and the second human perceptible rendering captured is at least a part of an image.

The computer program product may include optional features whereby at least one selected from a group including the first human perceptible rendering captured and the second human perceptible rendering captured is at least a part of audio.

The computer program product may include optional features whereby the web service is granted additionally responsive to at least one action performed by the second computing device.

The computer program product may include optional features whereby the access is granted in response to two or more queries made by computer code executing on the second computing device that is deposited onto the second computing device by the first computing device in response to the request.

The computer program product may include optional features whereby the second computing device authenticates the user via a biometric authentication.

What is claimed is:

1. A method of granting access to a user for a web service, the method comprising:
   receiving at a first computing device a request from a second computing device to authenticate the user for the web service;
   in response to the request, returning a first code from the first computing device to the second computing device, in a form that, when rendered by the second computing device, is rendered by the second computing device in a first human perceptible way, with the first code encoded in such rendering;
   by a third computing device, different from the first computing device and the second computing device, capturing a first human perceptible rendering performed by the second computing device of the encoded first code and providing an identifier of the user after the third computing device has authenticated the user;
   identifying the first code from the first human perceptible rendering captured;
   in response to the identifying the first code, providing a second code from the first computing device to the second computing device, in a form that, when rendered by the second computing device, is rendered by the second computing device in a second human perceptible way, with the second code encoded in such rendering;

by the third computing device, different from the first computing device and the second computing device, capturing a second human perceptible rendering performed by the second computing device of the encoded second code and providing an identifier of the user, automatically, without requiring user input beyond any user input used to cause the capturing of the first human perceptible rendering performed by the second computing device of the encoded first code;

identifying the second code from the second human-perceptible rendering captured; and granting access to the web service to be provided using the first computing device, responsive to the second code identified and the identifier of the user.

2. The method of claim 1, wherein at least one selected from a group comprising A and B:
A) the first human perceptible rendering captured; and
B) the second human perceptible rendering captured;
is at least a part of an image.

3. The method of claim 1, wherein at least one selected from a group comprising A and B:
A) the first human perceptible rendering captured; and
B) the second human perceptible rendering captured;
is at least a part of audio.

4. The method of claim 1 wherein the web service is granted additionally responsive to at least one action performed by the second computing device.

5. The method of claim 4, wherein the access is granted additionally in response to a plurality of queries made by computer code executing on the second computing device that is deposited onto the second computing device by the first computing device in response to the request.

6. The method of claim 1, wherein the second computing device authenticates the user via a biometric authentication.

7. A system for granting access to a user for a web service comprising:
a web service provider at a first computing device, the web service provider having an input coupled to a second computing device over a network, the web service provider input for receiving a request from the second computing device to authenticate the user for the web service, the web service provider for providing at an output a first signal responsive to the request; and
an image/audio generator having an input coupled to the web service provider output for receiving the first signal, the image/audio generator for providing at an output, in response to the first signal, a first set of information containing an encoded first code for rendering by the second computing device in a human perceptible way with the first code encoded in such rendering, and the first code; and
wherein the web service provider input is additionally coupled to the image/audio generator output for receiving the first set of information, the web service provider output is additionally coupled to the second computing device, and the web service provider is additionally for providing at the web service provider output, the first set of information to the second computing device in response to the request;
a device account authorization manager at a third computing device, separate from the first computing device and the second computing device, and having an input for receiving authentication information, the device account authorization manager for authenticating the user responsive to the authentication information, and for providing at an output a token identifying the user in response to the authenticating;

the system further comprising an element selected from a group comprising A and B:
A. an image/audio processing manager, at the third computing device, having an input coupled to the device account authorization manager output for receiving the token and to a camera or microphone of the third computing device, the image/audio processing manager for capturing via the camera or microphone a first human perceptible rendering of the first set of information performed by the second computing device where said rendering has the first code encoded therein, the image/audio processing manager for identifying a second code from the first human-perceptible rendering captured and providing the second code and the token at an output; and
a server processing manager having an input coupled to the image/audio processing manager output for receiving the second code and token; and
B. an image/audio processing manager, at the third computing device, having an input coupled to the device account authorization manager output for receiving the token and to a camera or microphone of the third computing device, the image/audio processing manager for capturing via the camera or microphone a first human perceptible rendering of the first set of information performed by the second computing device where the rendering has the first code encoded therein, the image/audio processing manager for providing at an output at least some of the first human-perceptible rendering captured and the token; and
a server processing manager having an input coupled to the image/audio processing manager output for receiving the at least some of the first human-perceptible rendering captured and the token, the server processing manager for identifying at an output a second code from the at least some of the human-perceptible rendering received;
and wherein:
the server processing manager input is additionally coupled to the image audio generator output for receiving the first code, and the server processing manager is additionally for comparing the first code with the second code and for providing at the server processing manager output a second signal responsive to the token and to the first code corresponding to the second code;
the image/audio generator input is additionally coupled to the server processing manager output for receiving the second signal, the image/audio generator additionally for providing at the image/audio generator output, in response to the second signal, a second set of information containing an encoded third code for rendering by the second computing device in a human perceptible way with the third code encoded in such rendering, and the first code; and
the web service provider input is additionally coupled to the image/audio generator output for receiving the second set of information, and the web service provider is additionally for providing at the web service provider output, the second set of information to the second computing device;
one selected from a group comprising C and D:
C. the image/audio processing manager is additionally for capturing via the camera or microphone a second human perceptible rendering of the second set of information performed by the second computing device where said rendering has the third code encoded therein, and for identifying a fourth code from the second human-perceptible rendering captured and providing the third code and the token at the image/audio processing manager output; and the server processing manager input is additionally for receiving the third code and token; and D. the image/audio processing manager is additionally for capturing via the camera or microphone a second human perceptible rendering of the second set of information performed by the second computing device where said rendering has the third code encoded therein, and for providing at the image/audio processing manager output at least some of the second human-perceptible rendering captured and the token; and the server processing manager is additionally for receiving the at least some of the second human-perceptible rendering captured and the token, the server processing manager additionally for identifying a fourth code from the at least some of the second human-perceptible rendering received; and the server processing manager input is additionally for receiving the third code, and the server processing manager is additionally for comparing the third code and the fourth code, and for providing at the server processing manager output a third signal responsive to the token and to the third code corresponding to the fourth code; and the web service provider input is additionally coupled to the server processing manager output for receiving the third signal, and for providing the web service responsive to the third signal.

8. The system of claim 7, wherein at least one selected from a group comprising E and F:

E. the first human perceptible rendering captured; and

F. the second human perceptible rendering captured;

is at least a part of an image.

9. The system of claim 7, wherein at least one selected from a group comprising E and F:

E) the first human perceptible rendering captured; and

F) the second human perceptible rendering captured;

is at least a part of audio.

10. The system of claim 7 additionally comprising a bind check manager on the second computing device for, performing at least one action via an input/output;

and wherein the access is granted additionally responsive to the at least one action.

11. The system of claim 10, wherein:

the bind check manager comprises computer code deposited on the second computing device by the web service provider via the web service provider output in response to the request; and the at least one action comprises a plurality of queries made by the bind check manager operating on the second computing device.

12. The system of claim 7, wherein the authentication information comprises biometric information.

13. A computer program product comprising a non-transitory computer useable medium having computer readable program code embodied therein for granting access to a user for a web service the computer program product comprising computer readable program code devices configured to cause a computer system to:

receive at a first computing device a request from a second computing device to authenticate the user for the web service;

in response to the request, return a first code from the first computing device to the second computing device, in a form that, when rendered by the second computing device, is rendered by the second computing device in a first human perceptible way, with the first code encoded in such rendering;

by a third computing device, different from the first computing device and the second computing device, capture a first human perceptible rendering performed by the second computing device of the encoded first code and provide an identifier of the user after the third computing device has authenticated the user;

identify the first code from the first human perceptible rendering captured;

in response to the identifying the first code, provide a second code from the first computing device to the second computing device, in a form that, when rendered by the second computing device, is rendered by the second computing device in a second human perceptible way, with the second code encoded in such rendering;

by the third computing device, different from the first computing device and the second computing device, capture a second human perceptible rendering performed by the second computing device of the encoded second code and provide an identifier of the user, automatically, without requiring user input beyond any user input used to cause the capturing of the first human perceptible rendering performed by the second computing device of the encoded first code;

identify the second code from the second human-perceptible rendering captured; and grant access to the web service to be provided using the first computing device, responsive to the second code identified and the identifier of the user.

14. The computer program product of claim 13, wherein at least one selected from a group comprising:

a) the first human perceptible rendering captured; and b) the second human perceptible rendering captured;

is at least a part of an image.

15. The computer program product of claim 13, wherein at least one selected from a group comprising:

a) the first human perceptible rendering captured; and b) the second human perceptible rendering captured;

is at least a part of audio.

16. The computer program product of claim 13 wherein the web service is granted additionally responsive to at least one action performed by the second computing device.

17. The computer program product of claim 16, wherein the access is granted in response to a plurality of queries made by computer code executing on the second computing device that is deposited onto the second computing device by the first computing device in response to the request.

18. The computer program product of claim 13, wherein the second computing device authenticates the user via a biometric authentication.

\* \* \* \* \*